United States Patent
Cudak et al.

(10) Patent No.: US 9,567,007 B2
(45) Date of Patent: Feb. 14, 2017

(54) IDENTIFYING COST-EFFECTIVE PARKING FOR AN AUTONOMOUS VEHICLE

(71) Applicant: International Business Machines Corporation, Armonk, NY (US)

(72) Inventors: Gary D. Cudak, Creedmoor, NC (US); Christopher J. Hardee, Raleigh, NC (US); Adrian X. Rodriguez, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 75 days.

(21) Appl. No.: 14/191,690

(22) Filed: Feb. 27, 2014

(65) Prior Publication Data

US 2015/0241241 A1   Aug. 27, 2015

(51) Int. Cl.
| | |
|---|---|
| *G01C 21/36* | (2006.01) |
| *B62D 15/02* | (2006.01) |
| *G01C 21/34* | (2006.01) |
| *G05D 1/00* | (2006.01) |
| *G06Q 10/08* | (2012.01) |
| *G08G 1/14* | (2006.01) |

(52) U.S. Cl.
CPC ............ *B62D 15/027* (2013.01); *G06Q 10/08* (2013.01); *G08G 1/146* (2013.01); *G08G 1/148* (2013.01)

(58) Field of Classification Search
CPC ............................ G01C 21/3685; G06Q 10/10
USPC ............ 701/408, 538; 705/5, 13; 340/932.2
See application file for complete search history.

(56) References Cited

U.S. PATENT DOCUMENTS

| | | | |
|---|---|---|---|
| 7,652,593 B1 | 1/2010 | Haynes et al. | |
| 7,825,827 B2 | 11/2010 | Jang et al. | |
| 8,432,297 B2 | 4/2013 | Sonnabend et al. | |
| 8,515,641 B2 | 8/2013 | Riegel | |
| 8,527,199 B1 | 9/2013 | Burnette et al. | |
| 2006/0250278 A1* | 11/2006 | Tillotson et al. | 340/932.2 |
| 2011/0022427 A1 | 1/2011 | Dayan | |
| 2011/0244887 A1* | 10/2011 | Dupray | G01C 21/206 455/456.2 |
| 2012/0056758 A1* | 3/2012 | Kuhlman et al. | 340/932.2 |

(Continued)

FOREIGN PATENT DOCUMENTS

| | | |
|---|---|---|
| EP | 0 634 039 B1 | 2/1998 |
| EP | 2 444 924 A1 | 4/2012 |
| JP | 2007233771 A | 9/2007 |

OTHER PUBLICATIONS

Scicluna et al., "FPGA-Based Autonomous Parking of a Car-Like Robot Using Fuzzy Logic Control", Proceedings of the 19th IEEE International Conference on Electronics, Circuits and Systems (ICECS), Dec. 2012, pp. 229-232, IEEE, Piscataway, NJ, USA, DOI: 10.1109/ICECS.2012.6463759.

*Primary Examiner* — Marthe Marc-Coleman
(74) *Attorney, Agent, or Firm* — Brandon C. Kennedy; Grant A. Johnson; Kennedy Lenart Spraggins LLP

(57) ABSTRACT

Identifying cost-effective parking for an autonomous vehicle, including: identifying, by a vehicle parking module, a plurality of available parking spots for parking the autonomous vehicle; determining, by the vehicle parking module, a total cost associated with each of the plurality of available parking spots for parking the autonomous vehicle; and selecting, by the vehicle parking module, a target parking spot in dependence upon the total cost associated with each of the plurality of available parking spots for parking the autonomous vehicle.

17 Claims, 4 Drawing Sheets

(56) References Cited

U.S. PATENT DOCUMENTS

| | | | |
|---|---|---|---|
| 2012/0058775 A1* | 3/2012 | Dupray | G01S 5/0257 455/456.1 |
| 2012/0072067 A1 | 3/2012 | Jecker et al. | |
| 2012/0095791 A1* | 4/2012 | Stefik et al. | 705/5 |
| 2012/0130777 A1* | 5/2012 | Kaufman | 705/13 |
| 2013/0231824 A1* | 9/2013 | Wilson | G05D 1/0088 701/26 |
| 2013/0288692 A1* | 10/2013 | Dupray | H04W 64/00 455/450 |
| 2014/0176348 A1* | 6/2014 | Acker, Jr. | G08G 1/144 340/932.2 |
| 2014/0306833 A1* | 10/2014 | Ricci | B60Q 1/00 340/901 |
| 2014/0313058 A1* | 10/2014 | Chen | G08G 1/141 340/932.2 |
| 2014/0350855 A1* | 11/2014 | Vishnuvajhala | G06Q 50/10 701/538 |
| 2014/0365250 A1* | 12/2014 | Ikeda | G06Q 50/30 705/5 |

* cited by examiner

IDENTIFYING COST-EFFECTIVE PARKING FOR AN AUTONOMOUS VEHICLE

BACKGROUND OF THE INVENTION

Field of the Invention

The field of the invention is data processing, or, more specifically, methods, apparatus, and products for identifying cost-effective parking for an autonomous vehicle.

Description of Related Art

Autonomous cars are becoming closer to being a mainstream product. States are now passing laws to allow use of autonomous vehicles. These vehicles are very advanced and use a multitude of sensors and software to operate. As with current vehicles, autonomous vehicles may be parked in parking garages and other locations that may or may not require the payment of a fee.

SUMMARY OF THE INVENTION

Methods, apparatuses, and products for identifying cost-effective parking for an autonomous vehicle, including: identifying, by a vehicle parking module, a plurality of available parking spots for parking the autonomous vehicle; determining, by the vehicle parking module, a total cost associated with each of the plurality of available parking spots for parking the autonomous vehicle; and selecting, by the vehicle parking module, a target parking spot in dependence upon the total cost associated with each of the plurality of available parking spots for parking the autonomous vehicle.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
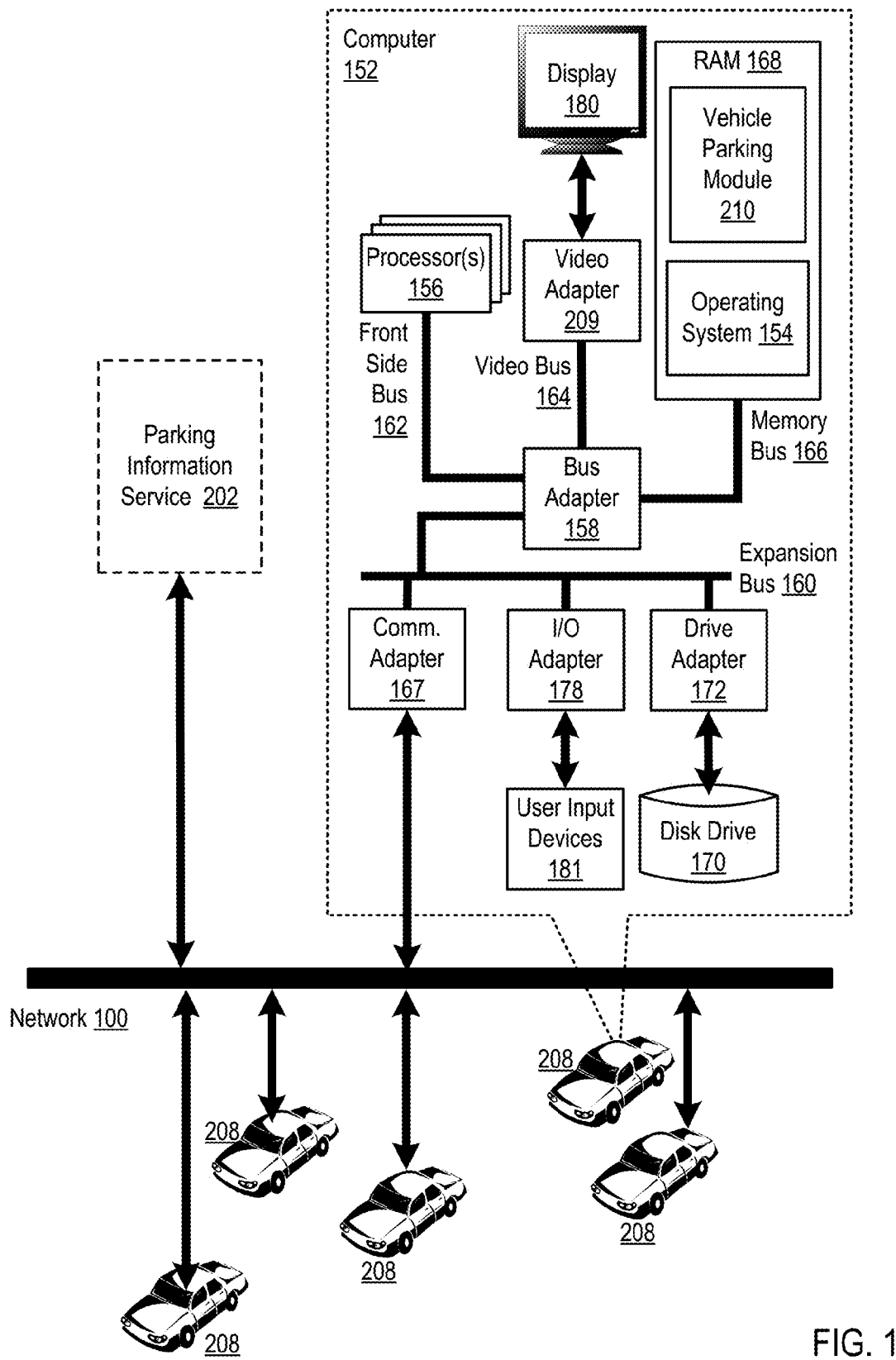
FIG. 1 sets forth a network diagram of a system for identifying cost-effective parking for an autonomous vehicle according to embodiments of the present invention.

Example methods, apparatuses, and products for identifying cost-effective parking for an autonomous vehicle in accordance with the present invention are described with reference to the accompanying drawings, beginning with FIG. 1. FIG. 1 sets forth a network diagram of a system for identifying cost-effective parking for an autonomous vehicle (208) according to embodiments of the present invention. The system of FIG. 1 includes a plurality of autonomous vehicles (208). Each autonomous vehicle (208) includes automated computing machinery in the form of an example computer (152).

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152). The computer (152) of FIG. 1 also includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for identifying cost-effective parking for an autonomous vehicle (208) according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards, mice, touchscreen displays, and so on. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus. The example computer (152) may also include various other components not shown here such as an altimeter, an accelerometer, a compass, a Global Positioning System ('GPS') receiver, and so on.

The example computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configure for identifying cost-effective parking for an autonomous vehicle (208) according to embodiments of the present invention include modems for wired dial-up communications, Ethernet (IEEE 802.3) adapters for wired data communications, and 802.11 adapters for wireless data communications. Other example protocols which may be supported by the communication adapter include: GSM (Global System For Mobile Communications) and CDMA (Code Division Multiple Access) protocols.

Stored in RAM (168) is a vehicle parking module (210), a module of computer program instructions that, when executed by the processor (156), causes the computer (152) to operate for identifying cost-effective parking for an autonomous vehicle (208) in accordance with embodiments of the present invention. The vehicle parking module (210) may be configured for identifying a plurality of available parking spots for parking the autonomous vehicle (208), determining a total cost associated with each of the plurality of available parking spots for parking the autonomous vehicle (208), and selecting a target parking spot in dependence upon the total cost associated with each of the plurality of available parking spots for parking the autonomous vehicle (208) as described in greater detail below.

Also stored in RAM (168) is an operating system (154). Operating systems useful in computers configured for identifying cost-effective parking for an autonomous vehicle (208) according to embodiments of the present invention include UNIX™, Linux™, Microsoft XP™, AIX™, IBM's i5/OS™, and others as will occur to those of skill in the art. The operating system (154) and vehicle parking module (210) in the example of FIG. 1 are shown in RAM (168), but many components of such software typically are stored in non-volatile memory also, such as, for example, on a disk drive (170).

The arrangement of autonomous vehicles, the parking information service (202), and other components making up the example system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
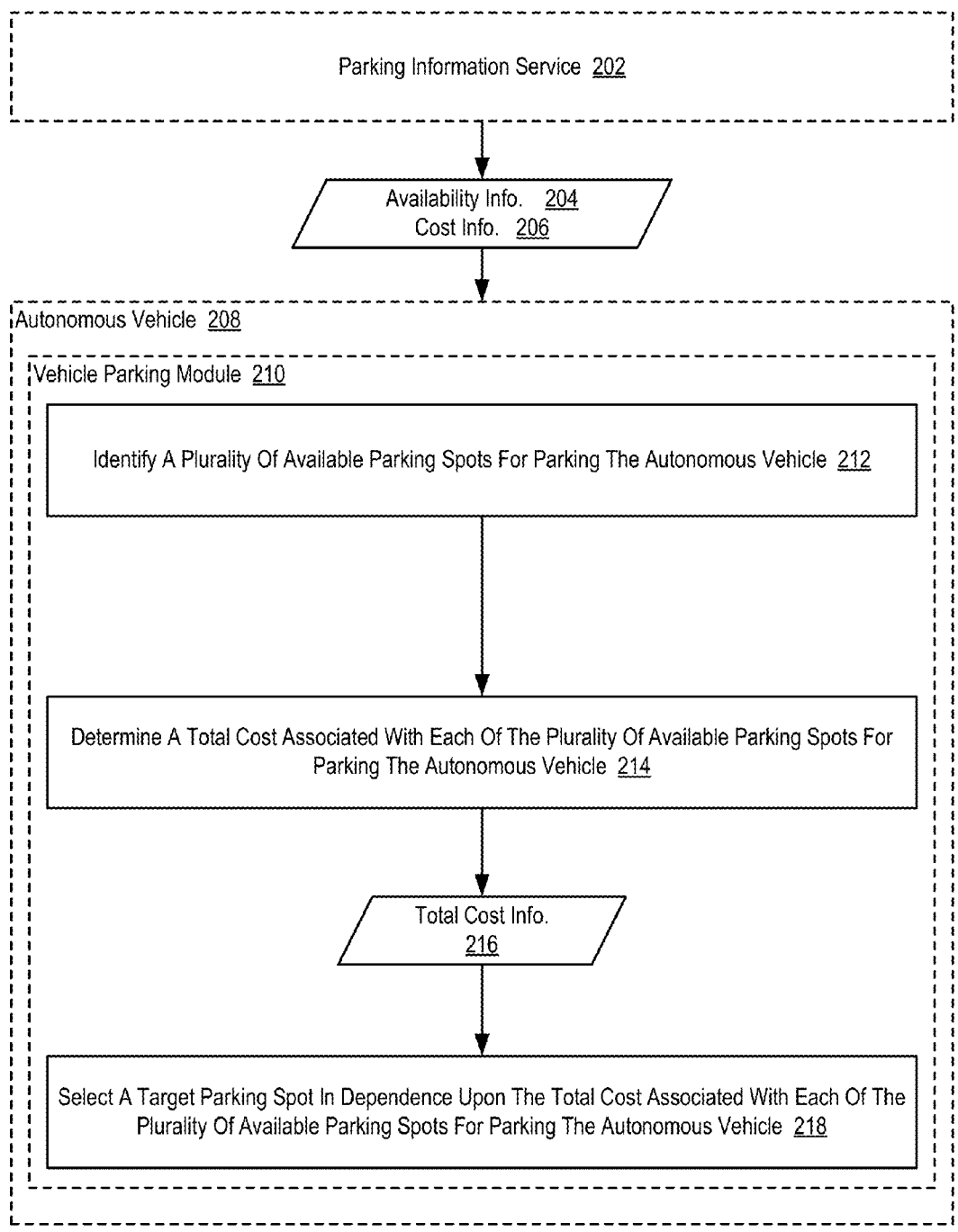
FIG. 2 sets forth a flow chart illustrating an example method for identifying cost-effective parking for an autonomous vehicle according to embodiments of the present invention.

For further explanation, FIG. 2 sets forth a flow chart illustrating an example method for identifying cost-effective parking for an autonomous vehicle (208) according to embodiments of the present invention. The autonomous vehicle (208) of FIG. 2 may also be referred to as a driverless car, self-driving car, robot car, or other moniker for an autonomous vehicle capable of fulfilling the human transportation capabilities of a traditional automobile, without the intervention of a human driver. Because the autonomous vehicle (208) is 'autonomous,' the autonomous vehicle (208) of FIG. 2 may be capable of sensing its environment and navigating without human input. Such an autonomous vehicle (208) may utilize technologies such as radar, lidar, GPS, computer vision, and others to sense their surroundings and to identify appropriate navigation paths, as well as obstacles and relevant signage.

The example method depicted in FIG. 2 is carried out, at least in part, by a vehicle parking module (210). In the example method of FIG. 2, the vehicle parking module (210) may be embodied as a module of computer program instructions executing on computer hardware such as a computer processor. The vehicle parking module (210) of FIG. 2 is depicted as residing within the autonomous vehicle (208). The vehicle parking module (210) may, for example, reside within a broader navigation control system that carries out many of the functions performed by the autonomous vehicle (208). Readers will appreciate that in alternative embodiments the vehicle parking module (210) of FIG. 2 may be supported by computer hardware that is not part of the autonomous vehicle (208), such as computer hardware in a mobile communications device, computer hardware maintained by a third-party service that is configured for communications with the autonomous vehicle (208), and so on. Reader will further appreciate that while the method depicted in FIG. 2 is described as being carried out by a vehicle parking module (210), the vehicle parking module (210) may also be embodied as a plurality of distinct modules that collectively perform the operations described herein.

The example method depicted in FIG. 2 includes a parking information service (202). The parking information service (202) of FIG. 2 may be embodied, for example, as a centralized repository for obtaining and distributing information describing parking locations. The parking information service (202) may be configured to obtain information describing parking locations, for example, by communicating with on-site computing equipment located at the parking location. Such on-site computing equipment located at the parking location can include, for example, a payment kiosk in a public parking lot, a computerized parking meter used to collect payment for on-street public parking spots, a ticket distribution machine in a parking garage, and so on. The on-site computing equipment may retain information such as the total number of parking spots for which the on-site computing equipment collects payment, distributes tickets, or otherwise monitors. The on-site computing equipment may also retain information that can be used to determine how many vehicles are currently parked in the available spots, including how many parking spots are currently paid for, how many outstanding parking passes have been distributed, and so on. The on-site computing equipment may utilize such information to determine the number of parking spots that are available for use by additional vehicles. The on-site computing equipment may be further configured to communicate information such as the maximum amount of time that a vehicle may park in the parking spots monitored by the on-site computing equipment, the cost per unit of time that is required for a vehicle to park in the parking spots monitored by the on-site computing equipment, the location of the parking facilities monitored by the on-site computing equipment, and so on.

Readers will appreciate that the parking information service (202) may collect such information from on-site computing equipment for many parking facilities, such that the parking information service (202) can retain information describing the cost, availability, location, and other information describing many parking facilities. Information may be exchanged between the on-site computing equipment and the parking information service (202) over a data communications network that is accessible using data communications hardware (e.g., a network adapter) in the on-site computing equipment, data communications hardware contained in a computing system that supports the parking information service (202), and so on.

The example method depicted in FIG. 2 includes identifying (212), by the vehicle parking module (210), a plurality of available parking spots for parking the autonomous vehicle (208). Identifying (212) a plurality of available parking spots for parking the autonomous vehicle (208) may be carried out, for example, by the vehicle parking module (210) receiving availability information (204) from one or more parking information services (202). Such availability information (204) can include, for example, information describing the availability of parking spaces at a particular parking facility, information such a GPS coordinates describing the location of the particular parking facility, cost information (206) describing the fees charged to a vehicle to park at a particular parking facility, and so on. The vehicle parking module (210) may receive availability information (204) from the one or more parking information services (202), for example, over a data communications link such as a Wi-Fi link, a mobile communications network link, and so on. In such an example, the autonomous vehicle (208) may therefore include communications hardware such as a Wi-Fi adapter, a mobile communications network adapter, or other appropriate computing hardware for communicating over a data communications network. Readers will appreciate that although the example described above involves the vehicle parking module (210) obtaining availability information (204) from a centralized parking information service (202), in other embodiments the vehicle parking module (210) may be configured to communicate directly with on-site parking equipment to obtain availability information (204).

The example method depicted in FIG. 2 also includes determining (214), by the vehicle parking module (210), a total cost associated with each of the plurality of available parking spots for parking the autonomous vehicle (208). The total cost associated with each of the plurality of available parking spots for parking the autonomous vehicle (208) can include a plurality of contributing factors. The total cost may include, for example, the fee required to park in a particular parking spot, the amount of gasoline required to navigate the autonomous vehicle (208) from its current location to the location of a particular parking spot, the amount of tolls to be paid to utilize roadways that are required to navigate the autonomous vehicle (208) from its current location to the location of a particular parking spot, the cost associated with wear and tear on the autonomous vehicle to navigate the autonomous vehicle (208) from its current location to the location of a particular parking spot, and so on. In such a way, determining (214) a total cost associated with each of the plurality of available parking spots for parking the autonomous vehicle (208) may be carried out by calculating each cost associated with a particular parking spot and summing each cost associated with a particular parking spot to identify the total cost for each particular parking spot.

The example method depicted in FIG. 2 also includes selecting (218), by the vehicle parking module (210), a target parking spot in dependence upon the total cost (216) associated with each of the plurality of available parking spots for parking the autonomous vehicle (208). Selecting (218) a target parking spot in dependence upon the total cost (216) associated with each of the plurality of available parking spots for parking the autonomous vehicle (208) may be carried out, for example, by selecting the parking spot with the lowest total cost. Readers will appreciate that in some embodiments, however, the total cost (216) associated with each of the plurality of available parking spots for parking the autonomous vehicle (208) may only be one factor in selecting (218) a target parking spot. The vehicle parking module (210) may also take into account, for example, the likelihood that a particular parking spot may become unavailable in situations where a parking spot is located at a facility that is a significant distance away from the autonomous vehicle (208) and a small number of spaces are currently available at the facility. The vehicle parking module (210) may also take into account the availability of other low-cost spots that are relatively proximate to a particular parking spot in the event that the parking spot becomes unavailable, the proximity of a particular parking spot to a destination that the autonomous vehicle will be navigating to after it has been parked, and so on. As such, selecting (218) a target parking spot in dependence upon the total cost (216) associated with each of the plurality of available parking spots for parking the autonomous vehicle (208) may be carried out by applying a formula that uses the total cost (216) associated with each of the plurality of available parking spots as an input. Readers will appreciate that after the target spot has been selected (218), the autonomous vehicle (208) may navigate itself to the target parking spot.

Figure 3:
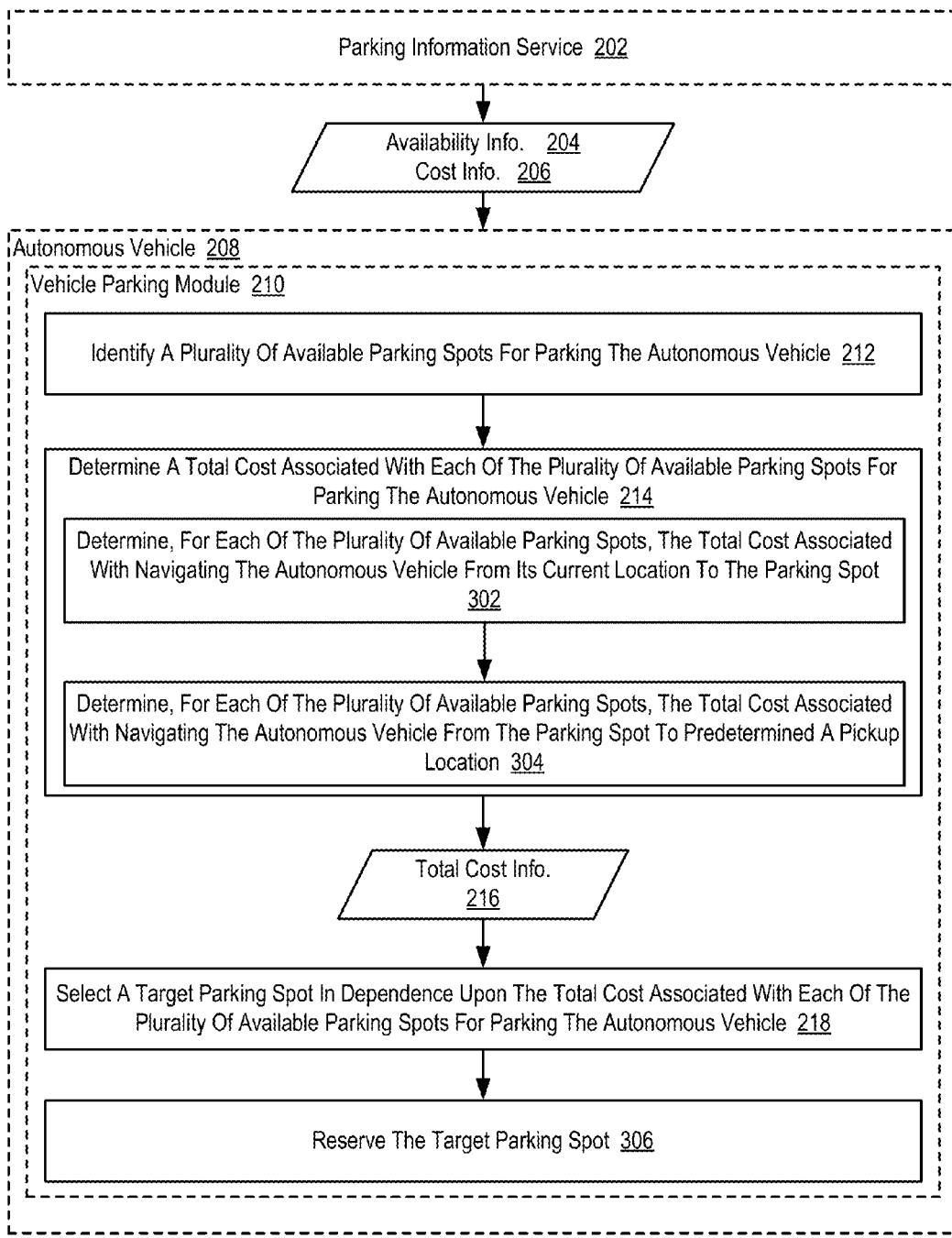
FIG. 3 sets forth a flow chart illustrating an additional example method for identifying cost-effective parking for an autonomous vehicle according to embodiments of the present invention.

For further explanation, FIG. 3 sets forth a flow chart illustrating an example method for identifying cost-effective parking for an autonomous vehicle (208) according to embodiments of the present invention. The example method depicted in FIG. 3 is similar to the example method depicted in FIG. 2, as it also includes identifying (212) a plurality of available parking spots for parking the autonomous vehicle (208), determining (214) a total cost associated with each of the plurality of available parking spots for parking the autonomous vehicle (208), and selecting (218) a target parking spot in dependence upon the total cost (216) associated with each of the plurality of available parking spots for parking the autonomous vehicle (208).

In the example method depicted in FIG. 3, determining (214) a total cost associated with each of the plurality of available parking spots for parking the autonomous vehicle (208) can include determining (302), by the vehicle parking module (210) for each of the plurality of available parking spots, the total cost associated with navigating the autonomous vehicle (208) from its current location to the parking spot. In the example method of FIG. 3, the total cost associated with navigating the autonomous vehicle (208) from its current location to the parking spot can include, for example, the cost of fuel that will be consumed by the autonomous vehicle (208) to navigate the autonomous vehicle (208) from its current location to the parking spot. In such an example, the vehicle parking module (210) may identify the route required to navigate the autonomous vehicle (208) from its current location to the parking spot using the address, GPS location, or other location information identifying the current location of the autonomous vehicle (208) and the address, GPS location, or other location information identifying the location of the parking spot. In such an example, the length of the route required to navigate the autonomous vehicle (208) from its current location to the parking spot, the fuel efficiency rating (e.g., miles-per-gallon) of the autonomous vehicle (208), and the cost of gasoline may be used to determine the cost of fuel that will be consumed by the autonomous vehicle (208) to navigate the autonomous vehicle (208) from its current location to the parking spot.

Readers will appreciate that in addition to the cost of fuel that will be consumed by the autonomous vehicle (208) to navigate the autonomous vehicle (208) from its current location to the parking spot, other cost required to navigate the autonomous vehicle (208) from its current location to the parking spot may also be determined (302). For example, the cost of wear and tear on the autonomous vehicle (208) may also be determined. Determining the cost of wear and tear on the autonomous vehicle (208) may be carried out, for example, by using the amount of mileage that a particular part of the autonomous vehicle (208) is rated for, the cost of the particular part, and the mileage to be traveled in order to navigate the autonomous vehicle (208) from its current location to the parking spot to determine the cost of wear and tear on the particular part.

Consider an example in which the autonomous vehicle (208) includes four tires, each of which has a recommended maximum usage of 50,000 miles. Assume in such an example that each tire costs $250 and that the distance to be traveled to navigate the autonomous vehicle (208) from its current location to the parking spot is 10 miles. In such an example, navigating the autonomous vehicle (208) from its current location to the parking spot would utilize 10/50,000 of the recommend tire life. At an expense of $250, such a trip would represent 5 cents ($250*[10/50000]) of the recommended life of each tire, such that the total cost of wear and tear on the tires would be a total of 20 cents. Readers will appreciate that the total cost required to navigate the autonomous vehicle (208) from its current location to the parking spot can also include, for example, the costs associated with wear and tear to other parts of the autonomous vehicle (208), the costs (e.g., tolls) required to utilize roadways required to navigate the autonomous vehicle (208) from its current location to the parking spot, and so on.

In the example method depicted in FIG. 3, determining (214) a total cost associated with each of the plurality of available parking spots for parking the autonomous vehicle (208) can include determining (304), by the vehicle parking module (210) for each of the plurality of available parking spots, the total cost associated with navigating the autonomous vehicle (208) from the parking spot to a predetermined pick up location. In the example method depicted in FIG. 3, a user of the autonomous vehicle (208) may specify a predetermined a pick up location that the autonomous vehicle (208) should navigate itself to some amount of time after the autonomous vehicle (208) has parked itself. For example, a user of the autonomous vehicle (208) may exit the autonomous vehicle (208) at a particular restaurant for dinner with friends, then subsequently take public transportation to a music venue to attend a concert with friends. In such an example, the user of the autonomous vehicle (208) may desire that the autonomous vehicle (208) park itself during dinner and the concert, then subsequently navigate itself from the parking spot to the music venue after the concert, rather than navigating itself back to the restaurant where the user was initially dropped off. The user may specify the predetermined pick up location for the autonomous vehicle (208) to navigate itself to some amount of time after the autonomous vehicle (208) has parked itself, for example, through the use of a GUI presented by a display screen within the autonomous vehicle (208). In the example method of FIG. 3, determining (304) the total cost associated with navigating the autonomous vehicle (208) from the parking spot to a predetermined pick up location may be carried out, for example, by determining the cost of fuel required to navigate the autonomous vehicle (208) from a particular parking spot to the predetermined pick up location, the cost of wear and tear associated with navigating the autonomous vehicle (208) from a particular parking spot to the predetermined pick up location, and so on as described above.

The example method depicted in FIG. 3 also includes reserving (306), by the vehicle parking module (210), the target parking spot. The vehicle parking module (210) may reserve (306) the target parking spot, for example, by sending a reservation request to the parking information service (202). In such an example, the parking information service (202) may communicate with on-site parking equipment associated with the target parking spot to reserve a parking spot in the parking facility managed by the on-site parking equipment. Readers will appreciate that any costs associated with reserving (306) the target parking spot may be included in the determination (214) of the total cost associated with the target parking spot.

Figure 4:
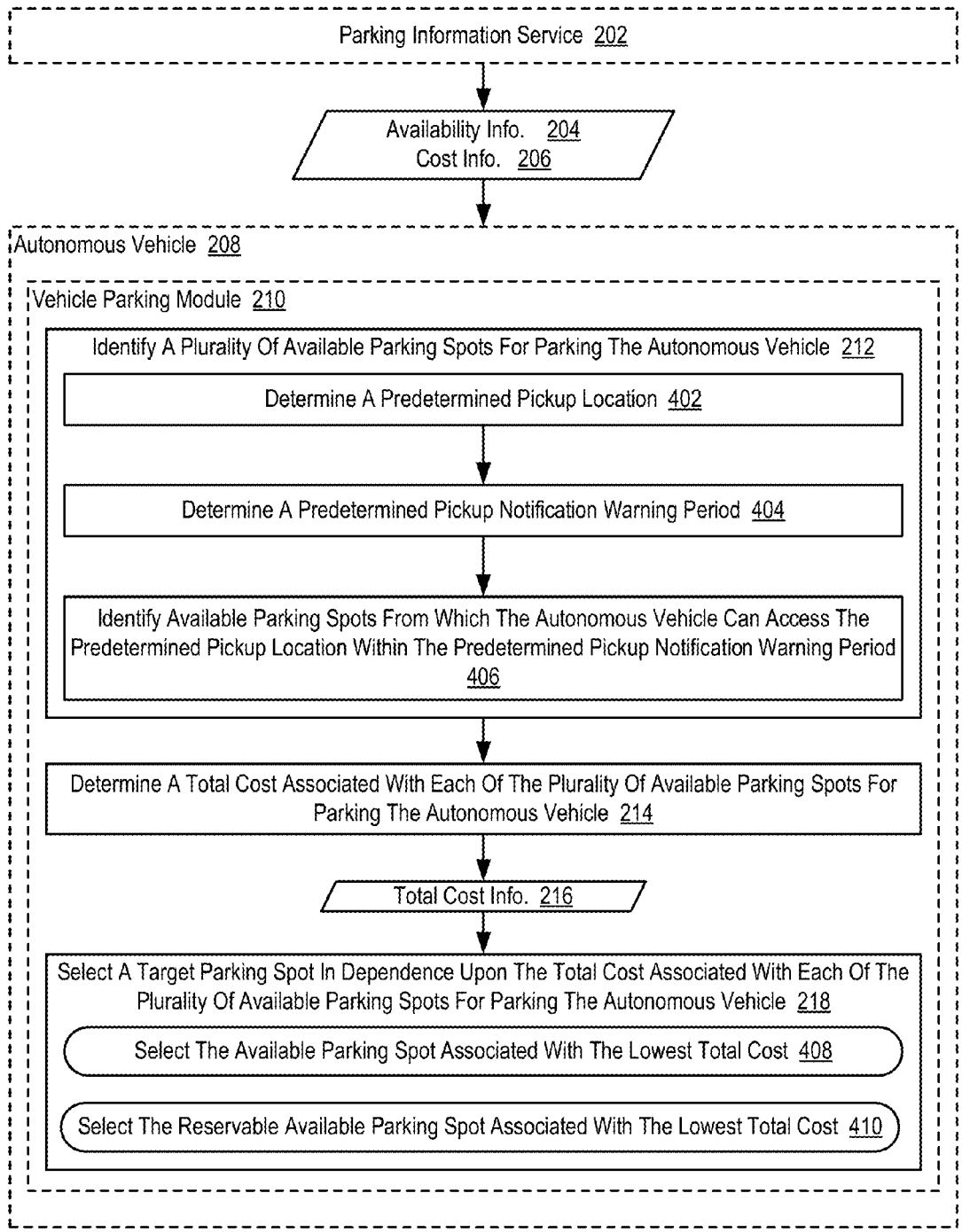
FIG. 4 sets forth a flow chart illustrating an additional example method for identifying cost-effective parking for an autonomous vehicle according to embodiments of the present invention.

For further explanation, FIG. 4 sets forth a flow chart illustrating an example method for identifying cost-effective parking for an autonomous vehicle (208) according to embodiments of the present invention. The example method depicted in FIG. 4 is similar to the example method depicted in FIG. 2, as it also includes identifying (212) a plurality of available parking spots for parking the autonomous vehicle (208), determining (214) a total cost associated with each of the plurality of available parking spots for parking the autonomous vehicle (208), and selecting (218) a target parking spot in dependence upon the total cost (216) associated with each of the plurality of available parking spots for parking the autonomous vehicle (208).

In the example method depicted in FIG. 4, identifying (212) a plurality of available parking spots for parking the autonomous vehicle (208) can include determining (402), by the vehicle parking module (210), a predetermined pick up location. The predetermined pick up location represents a destination that that autonomous vehicle (208) will travel to at some point in time after the autonomous vehicle (208) has parked itself. The vehicle parking module (210) may determine (402) a predetermined pick up location, for example, by receiving such a location from a user of the autonomous vehicle (208) through a GUI that is displayed by a display screen in the autonomous vehicle (208) prior to the user exiting the autonomous vehicle (208).

In the example method depicted in FIG. 4, identifying (212) a plurality of available parking spots for parking the autonomous vehicle (208) can also include determining (404), by the vehicle parking module (210), a predetermined pick up notification warning period. The predetermined pick up notification warning period represents the amount of time that the autonomous vehicle (208) has to navigate from a particular parking spot to the predetermined pick up location. The predetermined pick up notification warning period may be set, for example, by the user of the autonomous vehicle (208). For example, the user of the autonomous vehicle (208) may set the predetermined pick up notification warning period to a value representing the amount of time that the user can wait between instructing the autonomous vehicle (208) to navigate itself to the predetermined pick up location and the autonomous vehicle (208) actually arriving at the predetermined pick up location.

Consider an example in which the user of the autonomous vehicle (208) exits the autonomous vehicle (208) at a grocery store to shop for groceries. In such an example, when the user has almost completed shopping for groceries, the user may instruct the autonomous vehicle (208) to navigate itself back to the grocery store to pick up the user of the autonomous vehicle (208). The user may instruct the autonomous vehicle (208) to navigate itself back to the grocery store, for example, through the use of an application on the user's mobile communications device that can communicate with the autonomous vehicle (208) via a data communications network. In such an example, if the user sets the predetermined pick up notification warning period to a value of 10 minutes, the user may instruct the autonomous vehicle (208) to navigate itself back to the grocery store approximately 10 minutes prior to the time that the user expects to have completed their grocery shopping.

In the example method depicted in FIG. 4, identifying (212) a plurality of available parking spots for parking the autonomous vehicle (208) can also include identifying (406), by the vehicle parking module (210), available parking spots from which the autonomous vehicle (208) can access the predetermined pick up location within the predetermined pick up notification warning period. Identifying (406) available parking spots from which the autonomous vehicle (208) can access the predetermined pick up location within the predetermined pick up notification warning period may be carried out, for example, by calculating the amount of time required by the autonomous vehicle (208) to access the predetermined pick up location from a particular parking spot. Such a calculation may take into account the distance between a particular parking spot and the predetermined pick up location, the speed limit of various portions of the route between a particular parking spot and the predetermined pick up location, the expected traffic conditions between a particular parking spot and the predetermined pick up location, and so on.

Consider an example in which the predetermined pick up notification warning period is set to a value of 3 minutes. Assume that in such an example a first parking space is located 3 miles from the predetermined pick up location and that a second parking spot is located 0.5 miles from the predetermined pick up location. Further assume that in such an example, the route between the predetermined pick up location and each parking spot has an average travel velocity of 30 miles-per-hour. In such an example, the autonomous vehicle (208) would not be able to navigate the route between the first parking space and the predetermined pick up location within predetermined pick up notification warning period, as the autonomous vehicle (208) would not be able to navigate a 3 mile route in 3 minutes at a speed of 30 miles-per-hour. As such, the first parking spot would not be identified (212) as a viable parking spot for parking the autonomous vehicle (208). The autonomous vehicle (208), however, would be able to navigate the route between the second parking space and the predetermined pick up location within predetermined pick up notification warning period, as the autonomous vehicle (208) would be able to navigate a 0.5 mile route in 3 minutes at a speed of 30 miles-per-hour. As such, the second parking spot would be identified (212) as a viable parking spot for parking the autonomous vehicle (208).

In the example method depicted in FIG. 4, selecting (218) a target parking spot in dependence upon the total cost (216) associated with each of the plurality of available parking spots for parking the autonomous vehicle (208) can include selecting (408) the available parking spot associated with the lowest total cost. In such an example, the total cost associated with a particular parking spot may be the only relevant factor to take into consideration when selecting (218) a target parking spot. Alternatively, selecting (218) a target parking spot in dependence upon the total cost (216) associated with each of the plurality of available parking spots for parking the autonomous vehicle (208) could include selecting (410) a reservable available parking spot associated with the lowest total cost. In such an example, parking spots that may be reserved may be the only parking spots of interest when selecting (218) a target parking spot.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
   determining, by a vehicle parking module stored in memory and executing on a processor using one or more sensors, a predetermined pick up notification warning period by receiving the predetermined pick up notification warning period from a user of the autonomous vehicle, wherein the predetermined pick up notification warning period represents an amount of time that the user of the autonomous vehicle can wait between instructing the autonomous vehicle to navigate to a predetermined pick up location and the autonomous vehicle arriving at the predetermined pick up location;
   identifying, by a vehicle parking module, in dependence upon available parking spots accessible from the predetermined pick up location within the predetermined pick up notification warning period, a plurality of available parking spots for parking the autonomous vehicle, the plurality of available parking spots located a distance able to be navigated in a route to the predetermined pick up location within the predetermined pick up notification warning period;
   determining, by the vehicle parking module, a total cost associated with each of the plurality of available parking spots for parking the autonomous vehicle, wherein determining, by the vehicle parking module, the total cost associated with each of the plurality of available parking spots for parking the autonomous vehicle comprises:
      determining, by the vehicle parking module for each of the plurality of available parking spots, a first cost associated with navigating the autonomous vehicle from its current location to the parking spot; and
      determining, by the vehicle parking module for each of the plurality of available parking spots, a second cost associated with navigating the autonomous vehicle from the parking spot to the predetermined pick up location; and
   selecting, by the vehicle parking module, a target parking spot in dependence upon the total cost associated with each of the plurality of available parking spots for parking the autonomous vehicle.

2. The method of claim 1 further comprising reserving, by the vehicle parking module, the target parking spot.

3. The method of claim 1 wherein selecting, by the vehicle parking module, the target parking spot in dependence upon the total cost associated with each of the plurality of available parking spots for parking the autonomous vehicle further comprises selecting the available parking spot associated with the lowest total cost.

4. The method of claim 1 wherein selecting, by the vehicle parking module, the target parking spot in dependence upon the total cost associated with each of the plurality of available parking spots for parking the autonomous vehicle further comprises selecting a reservable available parking spot associated with the lowest total cost.

5. The method of claim 1 wherein identifying, by the vehicle parking module, the plurality of available parking spots for parking the autonomous vehicle further comprises determining, by the vehicle parking module, the predetermined pick up location.

6. The method of claim 1 wherein selecting the target parking spot further includes selecting the target parking spot in dependence upon a likelihood associated with each of the plurality of available parking spots that a parking spot of the plurality of available parking spots will become unavailable.

7. The method of claim 1 wherein selecting the target parking spot further includes selecting the target parking spot in dependence upon availability of other parking spots that are proximate to each of the plurality of available parking spots in an event that a parking spot of the plurality of available parking spots becomes unavailable.

8. An apparatus comprising a computer processor, a computer memory operatively coupled to the computer processor, the computer memory having disposed within it computer program instructions that, when executed by the computer processor, cause the computer processor to:
   determine, by a vehicle parking module stored in memory and executing on a processor using one or more sensors, a predetermined pick up notification warning period by receiving the predetermined pick up notification warning period from a user of the autonomous vehicle, wherein the predetermined pick up notification warning period represents an amount of time that the user of the autonomous vehicle can wait between instructing the autonomous vehicle to navigate to a predetermined pick up location and the autonomous vehicle arriving at the predetermined pick up location;

identifying, by a vehicle parking module, in dependence upon available parking spots accessible from the predetermined pick up location within the predetermined pick up notification warning period, a plurality of available parking spots for parking the autonomous vehicle, the plurality of available parking spots located a distance able to be navigated in a route to the predetermined pick up location within the predetermined pick up notification warning period;

determine, by the vehicle parking module, a total cost associated with each of the plurality of available parking spots for parking the autonomous vehicle, wherein determine, by the vehicle parking module, the total cost associated with each of the plurality of available parking spots for parking the autonomous vehicle comprises:

determine, by the vehicle parking module for each of the plurality of available parking spots, a first cost associated with navigating the autonomous vehicle from its current location to the parking spot; and determine, by the vehicle parking module for each of the plurality of available parking spots, a second cost associated with navigating the autonomous vehicle from the parking spot to the predetermined pick up location; and select, by the vehicle parking module, a target parking spot in dependence upon the total cost associated with each of the plurality of available parking spots for parking the autonomous vehicle.

9. The apparatus of claim 8 further comprising computer program instructions that, when executed by the computer processor, cause the computer processor to reserve, by the vehicle parking module, the target parking spot.

10. The apparatus of claim 8 wherein select, by the vehicle parking module, the target parking spot in dependence upon the total cost associated with each of the plurality of available parking spots for parking the autonomous vehicle further comprises select the available parking spot associated with the lowest total cost.

11. The apparatus of claim 8 wherein select, by the vehicle parking module, the target parking spot in dependence upon the total cost associated with each of the plurality of available parking spots for parking the autonomous vehicle further comprises select a reservable available parking spot associated with the lowest total cost.

12. The apparatus of claim 8 wherein identify, by the vehicle parking module, the plurality of available parking spots for parking the autonomous vehicle further comprises determine, by the vehicle parking module, the predetermined pick up location.

13. A computer program product including a non-transitory computer readable storage medium having computer program instructions that, when executed, cause a computer to carry out:

determining, by a vehicle parking module stored in memory and executing on a processor using one or more sensors, a predetermined pick up notification warning period by receiving the predetermined pick up notification warning period from a user of the autonomous vehicle, wherein the predetermined pick up notification warning period represents an amount of time that the user of the autonomous vehicle can wait between instructing the autonomous vehicle to navigate to a predetermined pick up location and the autonomous vehicle arriving at the predetermined pick up location;

identifying, by a vehicle parking module, in dependence upon available parking spots accessible from the predetermined pick up location within the predetermined pick up notification warning period, a plurality of available parking spots for parking the autonomous vehicle, the plurality of available parking spots located a distance able to be navigated in a route to the predetermined pick up location within the predetermined pick up notification warning period;

determining, by the vehicle parking module, a total cost associated with each of the plurality of available parking spots for parking the autonomous vehicle, wherein determining, by the vehicle parking module, the total cost associated with each of the plurality of available parking spots for parking the autonomous vehicle comprises:

determining, by the vehicle parking module for each of the plurality of available parking spots, a first cost associated with navigating the autonomous vehicle from its current location to the parking spot; and determining, by the vehicle parking module for each of the plurality of available parking spots, a second cost associated with navigating the autonomous vehicle from the parking spot to the predetermined pick up location; and selecting, by the vehicle parking module, a target parking spot in dependence upon the total cost associated with each of the plurality of available parking spots for parking the autonomous vehicle.

14. The computer program product of claim 13 further comprising computer program instructions that, when executed, cause the computer to carry reserving, by the vehicle parking module, the target parking spot.

15. The computer program product of claim 13 wherein selecting, by the vehicle parking module, the target parking spot in dependence upon the total cost associated with each of the plurality of available parking spots for parking the autonomous vehicle further comprises selecting the available parking spot associated with the lowest total cost.

16. The computer program product of claim 13 wherein selecting, by the vehicle parking module, the target parking spot in dependence upon the total cost associated with each of the plurality of available parking spots for parking the autonomous vehicle further comprises selecting a reservable available parking spot associated with the lowest total cost.

17. The computer program product of claim 13 wherein identifying, by the vehicle parking module, the plurality of available parking spots for parking the autonomous vehicle further comprises determining, by the vehicle parking module, the predetermined pick up location.

\* \* \* \* \*